(12) United States Patent
Creamer et al.

(10) Patent No.: US 10,479,959 B2
(45) Date of Patent: Nov. 19, 2019

(54) SURFACTANTS FOR SPOT PREVENTION IN AUTOMATIC DISHWASHING COMPOSITIONS

(71) Applicants: Dow Global Technologies LLC, Midland, MI (US); Rohm and Haas Company, Collegeville, PA (US)

(72) Inventors: Marianne P. Creamer, Warrington, PA (US); Edward D. Daugs, Midland, MI (US); Severine Ferrieux, Grasse (FR); Sara B. Klamo, Houston, TX (US); Paul Mercando, Pennsburg, PA (US); Eric P. Wasserman, Collegeville, PA (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/781,896

(22) PCT Filed: Mar. 20, 2017

(86) PCT No.: PCT/US2017/023135
§ 371 (c)(1),
(2) Date: Jun. 6, 2018

(87) PCT Pub. No.: WO2017/172394
PCT Pub. Date: Oct. 5, 2017

(65) Prior Publication Data
US 2019/0016993 A1 Jan. 17, 2019

(30) Foreign Application Priority Data
Mar. 31, 2016 (EP) ..................... 16290059

(51) Int. Cl.
*C11D 1/72* (2006.01)
*C11D 3/37* (2006.01)
*C07C 43/10* (2006.01)
*C07C 43/11* (2006.01)
*C08G 65/22* (2006.01)
*C08G 65/26* (2006.01)
*C11D 11/00* (2006.01)

(52) U.S. Cl.
CPC .............. *C11D 1/721* (2013.01); *C08G 65/22* (2013.01); *C08G 65/2609* (2013.01); *C11D 3/3757* (2013.01); *C11D 11/0023* (2013.01)

(58) Field of Classification Search
CPC .. C11D 1/72; C11D 3/37; C07C 43/10; C07C 43/11
See application file for complete search history.

(56) References Cited

U.S. PATENT DOCUMENTS

| | | | |
|---|---|---|---|
| 4,375,565 A * | 3/1983 | Greif | ...................... C07C 43/11 510/220 |
| 5,294,365 A | 3/1994 | Welch et al. | |
| 5,766,371 A | 6/1998 | Bunch et al. | |
| 6,599,871 B2 | 7/2003 | Smith | |

FOREIGN PATENT DOCUMENTS

WO 9722651 6/1997

* cited by examiner

*Primary Examiner* — Brian P Mruk
(74) *Attorney, Agent, or Firm* — Thomas S. Deibert

(57) ABSTRACT

A surfactant for use in an automatic dishwashing composition is provided, wherein the surfactant is a glycidyl ether-capped ethoxylated alcohol as noted in formula I. Wherein $R_1$ is a linear, saturated $C_{8-24}$ alkyl group, $R_2$ is a linear or branched saturated $C_{6-20}$ alkyl group, m has an average value of 10 to 50, and n has an average value of >1 to 2. Also provided are automatic dishwashing compositions comprising said surfactant.

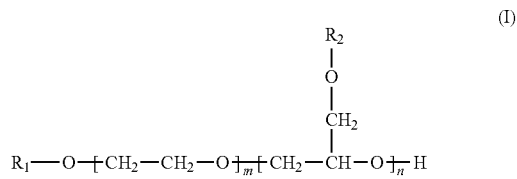

10 Claims, No Drawings

SURFACTANTS FOR SPOT PREVENTION IN AUTOMATIC DISHWASHING COMPOSITIONS

The present invention relates to surfactants for spot prevention compositions. In particular, the present invention relates to automatic dishwashing compositions incorporating such surfactants having reduced spotting on dishware.

Automatic dishwashing compositions are generally recognized as a class of detergent compositions distinct from those used for fabric washing or water treatment. Automatic dishwashing compositions are expected by users to produce a spotless and film-free appearance on washed articles after a complete cleaning cycle.

A family of hydroxypolyethers as low foam surfactants are disclosed by Welch et al. in U.S. Pat. No. 5,294,365 for use as rinse aids in phosphate containing machine dishwashing detergent formulations. Welch et al. disclose a compound of the formula

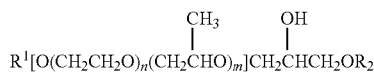

wherein $R^1$ and $R^2$ are the same or different and are a linear or branched $C_{1-18}$ alkyl radical; n is a number from 15 to 45; and m is a number of from 0 to 3.

Notwithstanding phosphate-free compositions are increasingly desirable. Phosphate-free compositions rely on non-phosphate builders, such as salts of citrate, carbonate, silicate, disilicate, bicarbonate, aminocarboxylates and others to sequester calcium and magnesium from hard water and block them from leaving an insoluble visible deposit on the dishware following drying. Phosphate-free compositions, however, have a greater tendency to leave spots on glassware and other surfaces.

Compositions that exhibit improved properties in automatic dishwashing and that are phosphate-free would be an advance in the industry. Accordingly, there remains a need for new surfactants having anti-spotting properties. In particular, there remains a need for new surfactants having anti-spotting properties that facilitate automatic dishwashing formulations that are both phosphate-free and anti-spotting.

The present invention provides a surfactant for use in an automatic dishwashing composition, wherein the surfactant is a glycidyl ether-capped ethoxylated alcohol of formula I:

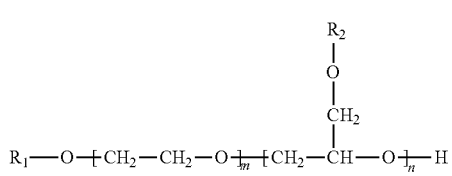

wherein $R_1$ is a linear, saturated $C_{8-24}$ alkyl group, $R_2$ is a linear or branched saturated $C_{6-20}$ alkyl group, m has an average value of 10 to 50, and n has an average value of >1 to 2.

The present invention provides an automatic dishwashing composition comprising: a dispersant polymer comprising monomer units of at least one of acrylic acid, methacrylic acid, itaconic acid and maleic acid; a builder; and a surfactant, wherein the surfactant is a glycidyl ether-capped ethoxylated alcohol of formula I:

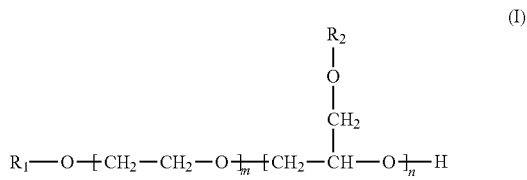

wherein $R_1$ is a linear, saturated $C_{8-24}$ alkyl group, $R_2$ is a linear or branched saturated $C_{6-20}$ alkyl group, m has an average value of 10 to 50, and n has an average value of >1 to 2.

The present invention provides a method of cleaning an article in an automatic dishwashing machine, the method comprising: applying to the article an automatic dishwashing composition of the present invention.

DETAILED DESCRIPTION

When incorporated in automatic dishwashing compositions (particularly phosphate-free automatic dishwashing compositions), the surfactant of the present invention based on the reaction of certain glycidyl ethers with a group of ethoxylated alcohols, dramatically improves the antispotting performance of the automatic dishwashing composition.

Unless otherwise indicated, numeric ranges (for instance, "from 2 to 10") are inclusive of the numbers defining the range (e.g., 2 and 10).

Unless otherwise indicated, ratios, percentages, parts, and the like are by weight. Weight percentages (or wt %) in the composition are percentages of dry weight, i.e., excluding any water that may be present in the composition. Percentages of monomer units in the polymer are percentages of solids weight, i.e., excluding any water present in a polymer emulsion.

As used herein, unless otherwise indicated, the terms "molecular weight" and "Mw" are used interchangeably to refer to the weight average molecular weight as measured in a conventional manner with gel permeation chromatography (GPC) and conventional standards, such as polyethylene glycol standards. GPC techniques are discussed in detail in Modem Size Exclusion Chromatography, W. W. Yau, J. J. Kirkland, D. D. Bly; Wiley-lnterscience, 1979, and in A Guide to Materials Characterization and Chemical Analysis, J. P. Sibilia; VCH, 1988, p. 81-84. Molecular weights are reported herein in units of Daltons.

The term "ethylenically unsaturated" is used to describe a molecule or moiety having one or more carbon-carbon double bonds, which renders it polymerizable. The term "ethylenically unsaturated" includes monoethylenically unsaturated (having one carbon-carbon double bond) and multi-ethylenically unsaturated (having two or more carbon-carbon double bonds). As used herein the term "(meth)acrylic" refers to acrylic or methacrylic.

The terms "Ethyleneoxy" and "EO" as used herein and in the appended claims refer to —$CH_2$—$CH_2$—O—.

The term "phosphate-free" as used herein and in the appended claims means compositions containing less than 0.5 wt % (preferably, less than 0.2 wt %; more preferably, less than 0.1 wt %; most preferably, less than the detectable limit) of phosphate (measured as elemental phosphorus).

Preferably, the surfactant of the present invention is a glycidyl ether-capped ethoxylated alcohol of formula I:

$$R_1\!-\!O\!-\!\!\left[\!CH_2\!-\!CH_2\!-\!O\!\right]_m\!\!\left[\!CH_2\!-\!\underset{\underset{\underset{R_2}{|}}{\underset{|}{O}}}{CH}\!-\!O\!\right]_n\!\!H \qquad (I)$$

wherein $R_1$ is a linear saturated $C_{8-24}$ alkyl group (preferably, a linear saturated $C_{10-14}$ alkyl group; more preferably, a linear saturated $C_{10-12}$ alkyl group; more preferably, a linear saturated $C_{10}$ alkyl group or a linear saturated $C_{12}$ alkyl group); $R_2$ is a linear saturated or branched saturated $C_{6-20}$ alkyl group (preferably, a branched saturated $C_{6-10}$ alkyl group; more preferably, a 2-ethylhexyl group); m has an average value of 10 to 50 (preferably, 10 to 30; more preferably, 15 to 30; still more preferably, 18 to 22; yet still more preferably, 19 to 21; most preferably, 20); and n has an average value of >1 to 2 (preferably, 1.1 to 2; more preferably, 1.2 to 1.6). The glycidyl ether-capped ethoxylated alcohol surfactant of formula I may include a mixture of compounds containing a range of alkyl groups at $R_1$ and $R_2$ differing in carbon number, but having average carbon numbers that conform to the ranges described above.

The surfactant glycidyl ether-capped ethoxylated alcohols of formula I of the present invention, may be readily prepared using known synthetic procedures. For instance, a typical procedure for preparing the compounds is as follows. An alcohol conforming to the formula $R_1OH$ (wherein $R_1$ is a linear, saturated $C_{8-24}$ alkyl group) is added to a reactor, and heated in the presence of a base (for example, sodium methoxide or potassium hydroxide). The mixture should be relatively free of water. To this mixture is then added the desired amount of ethylene oxide (EO) under pressure. After the EO has been consumed (as indicated by a substantial fall in reactor pressure), the resulting ethoxylated alcohol may be isolated and subjected to reaction with an alkyl glycidyl ether (wherein the alkyl group contains from 6 to 20 carbon atoms) at a molar ratio of alcohol:glycidyl ether ranging from 1:1.1 to 1:2 under basic conditions. Alternatively, the ethoxylated alcohol may remain in the original reactor and be subjected to further reaction by addition of alkyl glycidyl ether. The molar ratio of catalyst to alcohol can be between 0.01:1 and 1:1, but preferably is 0.02:1 to 0.5:1. Alternatively, a Lewis acid catalyst (for example, boron trifluoride etherate) may be employed at a molar ratio to alcohol of 0.01:1 to 0.25:1. The reactions with EO and with alkyl glycidyl ether are generally conducted in the absence of solvent and at temperatures between 25 and 200° C., and preferably between 80 and 160° C.

Preferably, the automatic dishwashing composition of the present invention, comprises: a dispersant polymer comprising monomer units of at least one of acrylic acid, methacrylic acid, itaconic acid and maleic acid; a builder; and a surfactant, wherein the surfactant is a glycidyl ether-capped ethoxylated alcohol of formula I:

$$R_1\!-\!O\!-\!\!\left[\!CH_2\!-\!CH_2\!-\!O\!\right]_m\!\!\left[\!CH_2\!-\!\underset{\underset{\underset{R_2}{|}}{\underset{|}{O}}}{CH}\!-\!O\!\right]_n\!\!H \qquad (I)$$

wherein $R_1$ is a linear saturated $C_{8-24}$ alkyl group (preferably, a linear saturated $C_{10-14}$ alkyl group; more preferably, a linear saturated $C_{10-12}$ alkyl group; more preferably, a linear saturated $C_{10}$ alkyl group or a linear saturated $C_{12}$ alkyl group); $R_2$ is a linear saturated or branched saturated $C_{6-20}$ alkyl group (preferably, a branched saturated $C_{6-10}$ alkyl group; more preferably, a 2-ethylhexyl group); m has an average value of 10 to 50 (preferably, 10 to 30; more preferably, 15 to 30; still more preferably, 18 to 22; yet still more preferably, 19 to 21; most preferably, 20); and n has an average value of >1 to 2 (preferably, 1.1 to 2; more preferably, 1.2 to 1.6). The surfactant may be a mixture of glycidyl ether-capped ethoxylated alcohol compounds of formula I, wherein the surfactant is a mixture containing a range of alkyl groups at $R_1$ and $R_2$ differing in carbon number, but having average carbon numbers that conform to the ranges described above.

Preferably, the automatic dishwashing composition of the present invention, comprises: at least 0.5 wt % (preferably, at least 1 wt %), based on the dry weight of the automatic dishwashing composition. Preferably, the automatic dishwashing composition of the present invention, comprises: 0.5 to 15 wt % (preferably, 0.5 to 7 wt %; more preferably, 1 to 7 wt %), based on the dry weight of the automatic dishwashing composition.

The automatic dishwashing composition of the present invention, optionally further comprises, additional non-ionic surfactants. For example, the automatic dishwashing composition of the present invention, optionally further comprises: one or more additional non-ionic surfactants selected from the group consisting of ethylene oxide-propylene oxide di- or tri-block copolymers, alkoxylated fatty alcohols, amine oxides, alkyl ether sulfates, or alkylpolyglycosides may be included in the compositions.

Preferably, the dispersant polymer used in the automatic dishwashing composition of the present invention, comprises monomer units of at least one of acrylic acid, methacrylic acid, itaconic acid, and maleic acid. Preferably, the dispersant polymer comprises a (meth)acrylic polymer. Preferably, the dispersant polymer has a weight average molecular weight, Mw, of ≥2,000 (more preferably, ≥3,000; most preferably, ≥4,000) Daltons; and of ≤100,000 (more preferably, ≤70,000; more preferably, ≤50,000; more preferably, ≤30,000; more preferably, ≤25,000; more preferably, ≤20,000) Daltons. Preferably, the dispersant polymer has a weight average molecular weight, Mw, of 2,000 to 40,000 (more preferably, 4,000 to 20,000) Daltons.

Preferably, the dispersant polymer used in the automatic dishwashing composition of the present invention, comprises a homopolymer of (meth)acrylic acid, a copolymer of (meth)acrylic acid with at least one other ethylenically unsaturated monomers, salts thereof, and mixtures thereof. More preferably, the dispersant polymer used in the automatic dishwashing composition of the present invention, comprises a homopolymer of (meth)acrylic acid, a copolymer of (meth)acrylic acid with at least one other ethylenically unsaturated monomers, salts thereof, and mixtures thereof; wherein the copolymer of (meth)acrylic acid with at least one other ethylenically unsaturated monomers includes a copolymer of methacrylic acid and acrylic acid.

Preferably, the at least one other ethylenically unsaturated monomers for inclusion in the dispersant polymer may include one or more of esters of acrylic or (meth)acrylic acid (e.g., ethyl acrylate, butyl acrylate), styrene monomers (e.g., styrene), sulfonated monomers (e.g., 2-acrylamido-2-methylpropane sulfonic acid (AMPS); 2-methacrylamido-2-methylpropane sulfonic acid; 4-styrenesulfonic acid; vinylsulfonic acid; 3-allyloxy; 2-hydroxy-1-propane sulfonic acid (HAPS); 2-sulfoethyl(meth)acrylic acid; 2-sulfopropyl (meth)acrylic acid; 3-sulfopropyl(meth)acrylic acid; 4-sulfobutyl(meth)acrylic acid; substituted (meth)acrylamides (e.g., tert-butyl acrylamide) and salts thereof.

Preferably, the dispersant polymer used in the automatic dishwashing composition of the present invention, comprises a copolymer derived from polymerized units of 50 to 95 wt % (preferably, 70 to 93 wt %) acrylic acid and 5 to 50 wt % (preferably, 7 to 30 wt %) 2-acrylamido-2-methylpropane sulfonic acid sodium salt. More preferably, the dispersant polymer used in the automatic dishwashing composition of the present invention, comprises a copolymer derived from polymerized units of 50 to 95 wt % (preferably, 70 to 93 wt %) acrylic acid and 5 to 50 wt % (preferably, 7 to 30 wt %) 2-acrylamido-2-methylpropane sulfonic acid sodium salt; wherein the copolymer has a weight average molecular weight, Mw, of 2,000 to 40,000 (more preferably, 10,000 to 20,000) Daltons.

Preferably, the dispersant polymer used in the automatic dishwashing composition of the present invention, comprises a homopolymer of acrylic acid. More preferably, the dispersant polymer used in the automatic dishwashing composition of the present invention, comprises a homopolymer of acrylic acid; wherein the homopolymer of acrylic acid has a weight average molecular weight, Mw, of 2,000 to 40,000 (more preferably, 2,000 to 10,000) Daltons.

Preferably, the dispersant polymer used in the automatic dishwashing composition of the present invention, comprises a mixture of a homopolymer of acrylic acid and a copolymer derived from polymerized units of acrylic acid and 2-acrylamido-2-methylpropane sulfonic acid sodium salt. More preferably, the dispersant polymer used in the automatic dishwashing composition of the present invention, comprises a mixture of a homopolymer of acrylic acid and a copolymer derived from polymerized units of acrylic acid and 2-acrylamido-2-methylpropane sulfonic acid sodium salt; wherein the homopolymer of acrylic acid has a weight average molecular weight, Mw, of 2,000 to 40,000 (more preferably, 2,000 to 10,000) Daltons; and, wherein the copolymer has a weight average molecular weight, Mw, of 2,000 to 40,000 (more preferably, 10,000 to 20,000) Daltons.

Preferably, the automatic dishwashing composition of the present invention, comprises: ≥1 wt % (more preferably, ≥2 wt %; more preferably, ≥3 wt %; more preferably, ≥5 wt %) of the dispersant polymer, based on the dry weight of the automatic dishwashing composition. Preferably, the automatic dishwashing composition of the present invention, comprises: ≤10 wt % (more preferably, ≤8 wt %; more preferably, ≤6 wt %; more preferably, ≤4 wt %) of the dispersant polymer, based on the dry weight of the automatic dishwashing composition.

Dispersant polymers used in the automatic dishwashing composition of the present invention are commercially available from various sources, and/or they may be prepared using literature techniques. For instance, low-molecular weight dispersant polymers may be prepared by free-radical polymerization. A preferred method for preparing these polymers is by homogeneous polymerization in a solvent. The solvent may be water or an alcoholic solvent such as 2-propanol or 1,2-propanediol. The free-radical polymerization is initiated by the decomposition of precursor compounds such as alkali persulfates or organic peracids and peresters. The activation of the precursors may be by the action of elevated reaction temperature alone (thermal activation) or by the admixture of redox-active agents such as a combination of iron(II) sulfate and ascorbic acid (redox activation). In these cases, a chain-transfer agent is typically used to modulate polymer molecular weight. One class of preferred chain-transfer agents employed in solution polymerizations is the alkali or ammonium bisulfites. Specifically mentioned is sodium meta-bisulfite.

The dispersant polymer may be in the form of a water-soluble solution polymer, slurry, dried powder, or granules or other solid forms.

Preferably, the builder used in the automatic dishwashing composition of the present invention, comprises one or more carbonates or citrates. The term "carbonate(s)" as used herein and in the appended claims refers to alkali metal or ammonium salts of carbonate, bicarbonate, percarbonate, and/or sesquicarbonate. The term "citrate(s)" as used herein and in the appended claims refers to alkali metal citrates. Preferably, the builder used in the automatic dishwashing composition of the present invention, comprises one or more carbonates or citrates; wherein the carbonates and citrates are selected from the group consisting of carbonate and citrate salts of sodium, potassium and lithium (more preferably, sodium or potassium; most preferably, sodium salts). More preferably, the builder used in the automatic dishwashing composition of the present invention is selected from the group consisting of sodium carbonate, sodium bicarbonate, sodium citrate, and mixtures thereof.

Preferably, the automatic dishwashing composition of the present invention, comprises: ≥1 wt % (more preferably, ≥10 wt %; more preferably, ≥20 wt %; more preferably, ≥25 wt %) of the builder, based on the dry weight of the automatic dishwashing composition. Preferably, the automatic dishwashing composition of the present invention, comprises: ≤60 wt % (more preferably, ≤50 wt %; more preferably, ≤40 wt %; more preferably, ≤35 wt %) of the builder, based on the dry weight of the automatic dishwashing composition. Weight percentages of carbonates or citrates are based on the actual weights of the salts, including metal ions.

The automatic dishwashing composition of the present invention, optionally further comprises: an additive. Preferably, the automatic dishwashing composition of the present invention, optionally further comprises: an additive selected from the group consisting of an alkaline source, a bleaching agent (e.g., sodium percarbonate, sodium perborate) and optionally a bleach activator (e.g., tetraacetylethylenediamine (TAED)) and/or a bleach catalyst (e.g., manganese(II) acetate, or cobalt(II) chloride); an enzyme (e.g., protease, amylase, lipase, or cellulase); an aminocarboxylate chelant (e.g., methylglycinediacetic acid (MGDA), glutamic acid-N,N-diacetic acid (GLDA), iminodisuccinic acid (IDSA), 1,2-ethylenediamine disuccinic acid (EDDS), aspartic acid diacetic acid (ASDA), or mixtures or salts thereof); a phosphonate such as 1-hydroxy ethylidene-1,1-diphosphonic acid (HEDP); foam suppressants; colors; fragrances; silicates; additional builders; antibacterial agents and/or fillers. Fillers in tablets or powders are inert, water-soluble substances, typically sodium or potassium salts, e.g., sodium or potassium sulfate and/or chloride, and typically are present in amounts ranging from 0 wt % to 75 wt %. Fillers in gel formulations may include those mentioned above and also water. Fragrances, dyes, foam suppressants, enzymes and antibacterial agents usually total no more than 10 wt %, alternatively no more than 5 wt %, of the composition.

The automatic dishwashing composition of the present invention, optionally further comprises: an alkaline source. Suitable alkaline sources include, without limitation, alkali metal carbonates and alkali metal hydroxides, such as sodium or potassium carbonate, bicarbonate, sesquicarbonate, sodium, lithium, or potassium hydroxide, or mixtures of the foregoing. Sodium hydroxide is preferred. The amount of alkaline source in the automatic dishwashing composition of the present invention, when present, may range, for instance, from at least 1 weight percent (preferably, at least 20 weight percent) and up to 80 weight percent (preferably, up to 60 weight percent), based on the dry weight of the automatic dishwashing composition.

The automatic dishwashing composition of the present invention, optionally further comprises: a bleaching agent. The amount of the bleaching agent in the automatic dishwashing composition of the present invention, when present, is preferably at a concentration of 1 to 25 wt % (more preferably, 1 to 10 wt %, based on the dry weight of the automatic dishwashing composition.

Preferably, the automatic dishwashing composition of the present invention, comprises: sodium carbonate, a sequestering agent (preferably sodium citrate), a bleaching agent (preferably sodium percarbonate), a bleaching activator (preferably TAED), a surfactant that is a glycidyl ether-capped ethoxylated alcohol of formula I and optionally a further nonionic surfactant (preferably an alkoxylate surfactant, a polyether polyol, or both), an enzyme (preferably protease, amylase, or both), a dispersant polymer (preferably a homopolymer of acrylic acid, a copolymer of acrylic acid and AMPS (or a salt of AMPS), or mixtures of the polymers), and optionally a water soluble silicate (preferably sodium disilicate).

Preferably, the automatic dishwashing composition of the present invention, comprises: 15 to 50 weight percent sodium carbonate, 5 to 35 weight percent of a sequestering agent (preferably sodium citrate), 5 to 15 weight percent of a bleaching agent (preferably, wherein the bleaching agent is sodium percarbonate), 1 to 5 weight percent of a bleaching activator (preferably, wherein the activator is TAED), 0.5 to 5 weight percent of the surfactant glycidyl ether-capped ethoxylated alcohol of formula I, 1 to 5 weight percent of an enzyme (preferably protease, amylase, or both), 1 to 10 weight percent of a dispersant polymer (preferably a homopolymer of acrylic acid, a copolymer of acrylic acid and AMPS (or a salt of AMPS), or mixtures of the polymers), and 1 to 10 weight percent of a water soluble silicate (preferably sodium disilicate), each amount being based on the dry weight of the automatic dishwashing composition.

Preferably, the automatic dishwashing composition of the present invention has a pH (at 1 wt % in water) of at least 9 (preferably, ≥10). Preferably, the automatic dishwashing composition of the present invention has a pH (at 1 wt % in water) of no greater than 13.

Preferably, the automatic dishwashing composition of the present invention can be formulated in any typical form, e.g., as a tablet, powder, block, monodose, sachet, paste, liquid or gel. The automatic dishwashing compositions of the present invention are useful for cleaning ware, such as eating and cooking utensils, dishes, in an automatic dishwashing machine.

Preferably, the automatic dishwashing composition of the present invention can be used under typical operating conditions. For instance, when used in an automatic dishwashing machine, typical water temperatures during the washing process preferably are from 20° C. to 85° C., preferably 30° C. to 70° C. Typical concentrations for the automatic dishwashing composition as a percentage of total liquid in the dishwasher preferably are from 0.1 to 1 wt %, preferably from 0.2 to 0.7 wt %. With selection of an appropriate product form and addition time, the automatic dishwashing compositions of the present invention may be present in the prewash, main wash, penultimate rinse, final rinse, or any combination of these cycles.

Preferably, the automatic dishwashing composition of the present invention comprises <0.5 wt % (preferably, <0.2 wt %; more preferably, <0.1 wt %; still more preferably, <0.01 wt %; most preferably, <the detectable limit) of phosphate (measured as elemental phosphorus). Preferably, the automatic dishwashing composition of the present invention is phosphate free.

Some embodiments of the present invention will now be described in detail in the following Examples.

Preparation of Surfactants

Materials: 1,2-epoxyoctane, 2-ethylhexyl glycidyl ether, 1-decanol, 1-dodecanol, 2-butyl-1-octanol, sodium methoxide solution were obtained from Sigma-Aldrich and used without further purification. 2-Ethylhexanol which had been reacted first with 5 equivalents of propylene oxide followed by 15 equivalents of ethylene oxide was obtained as a 90% solution in water from Dow Chemical and is referred to below as "2EH-PO5-EO15."

Analytical Methods

NMR: Quantitative $^{13}$C spectra were obtained on a Bruker 500 MHz instrument, running generally 6144 scans, experiment zgig30, pulse length 13.25 µs, recycle delay 5.000 s, 2 Hz line broadening.

Polymer Molecular Weight. Weight average molecular weight may be measured by gel permeation chromatography (GPC) using known methodology. GPC analysis was conducted on an Agilent 1100 Series GPC by dissolving 0.010 g of sample in 10 mL of THF and injecting a 50 µL aliquot of this solution onto a series of two Polymer Labs PLgel 5 µm MIXED-E columns (300×7.5 mm) and eluting with THF (either pure or containing 5% water) at a flow rate of 1.0 mL/min at 35° C. using differential refractive index detection (35° C.). A conventional calibration curve was generated using narrow polyethylene glycol standards.

Alkoxylation reactions were carried out in a 2-L 316 stainless steel conical bottom (minimum stirring volume 20 mL) Parr reactor, model 4530, equipped with a ¼ hp magnetic drive agitator, 1500 watt (115V) Calrod electric heater, ¼ inch water filled cooling coil, 1/16 inch dip tube for sampling, internal thermowell, ¼ inch rupture disc set at 1024 psig, ¼ inch relief valve set at 900 psig, an oxide addition line submerged below the liquid level, and a 2 inch diameter pitch-blade agitator. The bottom of the agitator shaft had a custom-made stainless steel paddle shaped to the contour of the reactor to allow stirring at very low initial volumes. The oxide addition system consisted of a 1 liter stainless steel addition cylinder, which was charged, weighed, and attached to the oxide load line. The reactor system was controlled by a Siemens SIMATIC PCS7 process control system. Reaction temperatures were measured with Type K thermocouples, pressures were measured with Ashcroft pressure transducers, ball valves were operated with Swagelok pneumatic valve actuators, cooling water flow was controlled with ASCO electric valves, and oxide addition rates were controlled by a mass flow control system consisting of a Brooks Quantim® Coriolis mass flow controller (model QMBC3L1B2A1A1A1DH1C7A1DA) and a TESCOM back pressure regulator (model 44-1163-24-109A) which maintained a 100 psig pressure differential across the mass flow controller to afford steady flow rates.

Reagent ratios are occasionally abbreviated "X eq.": wherein the added reagent is considered to have a molar ratio of X:1 relative to the original reactant.

Example 1: Synthesis of Decanol Ethoxylate

The 2-L Parr reactor was charged with 121.3 g of 1-decanol and 0.50 g of powdered 85% potassium hydroxide, and after a pressure check and series of nitrogen purges, the mixture warmed to 130° C. for the addition of 670.2 g of ethylene oxide (approximately 20 eq.) at an addition rate of 1 to 2 g/min After the addition was complete and the pressure stabilized, the reaction product was cooled and unloaded to afford 785.6 g. GPC results: $M_W$=1220, $M_N$=1140. $^{13}$C NMR in DMSO-$d_6$ (δ, ppm): 72.4, 70.3, 69.7, 69.8, 69.6, 60.2, 31.4, 29.3, 29.1, 29.1, 29.0, 28.8, 25.7, 22.1, 13.8.

Example 2: Synthesis of Dodecanol Ethoxylate

The 2-L Parr reactor was charged with 100.2 g of 1-decanol and 0.56 g of powdered 85% potassium hydroxide, and after a pressure check and series of nitrogen purges, the mixture warmed to 130° C. for the addition of 473.0 g of ethylene oxide (approximately 20 eq.) at an addition rate of 2 g/min After the addition was complete and the pressure stabilized, the reaction product was cooled and unloaded to afford 564.77 g. GPC results: $M_W$=1110, $M_N$=1045. $^{13}$C NMR in DMSO-$d_6$ (δ, ppm): 72.4, 70.4, 59.9, 69.6, 60.1, 31.4, 29.3, 29.1, 29.1, 29.0, 28.8, 25.7, 22.1, 13.8.

Example 3: Decanol Ethoxylate/2-Ethylhexyl Glycidyl Ether

To a round-bottom glass flask equipped with overhead stirrer, thermocouple, nitrogen sweep, and heating mantle were added 50 g of decanol ethoxylate from Example 1. Heat was applied until the decanol ethoxylate melted, then stirring was begun and 2.6 g sodium methoxide solution (25% in methanol, 25 mol % based on ethoxylate) was slowly added. The reactor was heated to 140° C., and upon reaching this temperature, addition of 13.5 g 2-ethylhexyl glycidyl ether (approximately 1.7 eq.) was begun and continued for 1 h. After addition, the reaction was stirred for an additional 6 h at 140° C., then was allowed to cool overnight. The next day, the reaction mixture was heated to 50° C., quenched with 0.43 g acetic acid, and then poured into a vial. $^{13}$C NMR in DMSO-$d_6$ (δ, ppm): 73.3, 72.8, 72.4, 70.3, 70.2, 69.9, 69.6, 68.5, 60.2, 31.4, 30.1, 29.3, 29.1, 29.0, 28.6, 25.7, 23.4, 22.6, 22.2, 13.8, 10.7.

Example 4: Dodecanol Ethoxylate/2-Ethylhexyl Glycidyl Ether

To a round-bottom glass flask equipped with overhead stirrer, thermocouple, nitrogen sweep, and heating mantle were added 51.5 g of dodecanol ethoxylate from Example 2. Heat was applied until the decanol ethoxylate melted, then stirring was begun and 2.6 g sodium methoxide solution (25% in methanol, 25 mol % based on ethoxylate) was slowly added. The reactor was heated to 140° C., and upon reaching this temperature, addition of 13.5 g 2-ethylhexyl glycidyl ether (approximately 1.3 eq.) was begun and continued for 1 h. After addition, the reaction was stirred for an additional 6 h at 140° C., then was allowed to cool overnight. The next day, the reaction mixture was heated to 50° C., quenched with 0.43 g acetic acid, and then poured into a vial. $^{13}$C NMR in DMSO-$d_6$ (δ, ppm): 73.3, 72.9, 72.5, 70.4, 70.1, 69.9, 69.6, 68.4, 60.1, 31.4, 30.1, 29.2, 28.8, 28.6, 25.7, 23.4, 22.6, 22.1, 13.8, 10.7.

Example 5: Synthesis of 2-Butyloctanol Ethoxylate

The 2-L Parr reactor was charged with 85.90 g of 2-butyl-1-octanol and 0.48 g of powdered 85% potassium hydroxide, and after a pressure check and series of nitrogen purges, the mixture warmed to 130° C. for the addition of 406.4 g of ethylene oxide (approximately 20 eq.) at an addition rate of 2 g/min After the addition was complete and the pressure stabilized, the reaction product was cooled and unloaded to afford 493.2 g. GPC results: $M_W$=1390, $M_N$=1190. $^{13}$C NMR in DMSO-$d_6$ (δ, ppm): 73.4, 72.4, 70.2, 69.9, 60.2, 58.0, 31.3, 30.9, 39.6, 29.2, 28.5, 26.2, 22.6, 22.1, 13.8.

Comparative Example C1: Decanol Ethoxylate/1,2-Epoxyoctane

To a round-bottom glass flask equipped with overhead stirrer, thermocouple, nitrogen sweep, and heating mantle were added 50 g of decanol ethoxylate from Example 1. Heat was applied until the decanol ethoxylate melted, then stirring was begun and 2.6 g sodium methoxide solution (25% in methanol, 25 mol % based on ethoxylate) was slowly added. The reactor was heated to 90° C., and upon reaching this temperature, addition of 9.3 g 1,2-epoxyoctane (approximately 1.7 eq.) was begun and continued for 1 h. After addition, the reaction was stirred for an additional 6 h at 140° C., then was allowed to cool overnight. The next day, the reaction mixture was heated to 90° C. and heated an additional 6 h, then was allowed to cool to 50° C., quenched with 0.43 g acetic acid, and then poured into a vial. $^{13}$C NMR in DMSO-$d_6$ (δ, ppm): 75.6, 72.4, 70.4, 70.0, 69.9, 69.6, 68.8, 68.6, 60.2, 33.7, 31.4, 29.3, 29.1, 29.0, 28.9, 25.7, 25.0, 22.1, 13.8, 13.8.

Comparative Example C2: 2-Butyloctanol Ethoxylate/2-Ethylhexyl Glycidyl Ether To a round-bottom glass flask equipped with overhead stirrer, thermocouple, nitrogen sweep, and heating mantle were added 51.5 g of 2-butyloctanol ethoxylate from Example 5. Heat was applied until the decanol ethoxylate melted, then stirring was begun and 2.6 g sodium methoxide solution (25% in methanol, 25 mol % based on ethoxylate) was slowly added. The reactor was heated to 140° C., and upon reaching this temperature, addition of 13.5 g 2-ethylhexyl glycidyl ether (approximately 1.3 eq.) was begun and continued for 1 h. After addition, the reaction was stirred for an additional 6 h at 140° C., then was allowed to cool overnight. The next day, the reaction mixture was heated to 50° C., quenched with 0.43 g acetic acid, and then poured into a vial. $^{13}$C NMR in DMSO-$d_6$ (δ, ppm): 73.5, 73.3, 72.7, 72.4, 70.5, 70.1, 69.9, 68.5, 60.2, 58.3, 37.6, 31.3, 30.9, 30.6, 30.1, 29.2, 28.5, 26.2, 23.4, 22.6, 22.1, 13.8, 10.8.

Comparative Example C3: 2-Ethylhexanol Alkoxylate/2-Ethylhexyl Glycidyl Ether

To a round-bottom glass flask equipped with overhead stirrer, thermocouple, nitrogen sweep, and heating mantle were added 57.8 g of 2EH-PO5-EO15 (90%). The kettle was heated to 140° C. with stirring and active nitrogen bubbling for 3 h to remove water. After cooling overnight, the temperature was raised to 70° C. and then 2.6 g sodium methoxide solution (25% in methanol, 25 mol % based on ethoxylate) was slowly added. The reactor was heated to 140° C., and upon reaching this temperature, addition of 13.5 g 2-ethylhexyl glycidyl ether (approximately 1.3 eq.) was begun and continued for 1 h. After addition, the reaction was stirred for an additional 6 h at 140° C., then was allowed to cool overnight. The next day, the reaction mixture was heated to 50° C., quenched with 0.43 g acetic acid, and then poured into a vial. $^{13}$C NMR in DMSO-d$_6$ (δ, ppm): 74.6, 74.6, 74.4, 74.3, 74.2, 73.3, 73.2, 72.9, 72.5, 72.4, 72.2, 70.6, 70.1, 69.8, 68.4, 67.9, 30.1, 28.5, 23.4, 22.5, 17.2, 13.9, 10.9.

Automatic Dishwashing Tests

The surfactants described in Examples 3-4 and Comparative Examples C1-C3 above are tested for their anti-spotting performance during automatic dishwashing. The dishwashing formulation used is shown in TABLE 1.

TABLE 1

| Ingredient | Weight Percent (as active) |
| --- | --- |
| MGDA | 15 |
| sodium citrate | 15 |
| sodium carbonate | 20 |
| sodium bicarbonate | 10 |
| sodium percarbonate | 15 |
| TAED | 4 |
| surfactant | 5 |
| dispersant[a] | 5 |
| protease[b] | 2 |
| amylase[c] | 1 |
| HEDP[d] | 2 |
| sodium sulfate | 6 |

[a]A 50:50 mixture of carboxylate polymers (ACUSOL ™ 588 and 902N).
[b]Savinase 12T, Novozymes.
[c]Stainzyme 12T, Novozymes.
[d]Dequest 2016DG, Italmatch Chemicals.

The food soil used in the automatic dishwashing tests is shown in TABLE 2.

TABLE 2

| Ingredients | Quantities for 3 L Batch |
| --- | --- |
| water | 2 L |
| margarine | 300 g |
| potato starch | 45 g |
| Quark powder | 75 g |
| benzoic acid | 3 g |
| milk | 150 g |
| egg yolks | 9 |
| ketchup | 75 g |
| mustard | 75 g |

Procedure for Preparing Food Soil

Heat water to 70° C. and add the potato starch, quark powder, benzoic acid and margarine. Agitate until the margarine is well dissolved. Then add the milk and agitate well. Let the mix cool down. When the temperature is lower than 45° C., add the egg yolks, ketchup and mustard. Mix well.

Dishwashing Test Conditions

Machine: Miele SS-ADW, Model G1222SC Labor. Program: V4, 50° C. wash cycle with heated wash, fuzzy logic disengaged, heated dry. Water: 375 ppm hardness (as $CaCO_3$, confirmed by EDTA titration), Ca:Mg=3:1, 250 ppm sodium carbonate. Food soil: 50 g (introduced at t=0, frozen in cup).

Spotting Test

After drying in open air spotting ratings were determined by trained evaluators by observations of glass tumblers in a light box with controlled illumination from below and ranging from 1 (no spots) to 5 (heavily spotted). Results are shown in TABLE 3 AND 4.

TABLE 3

| Spotting Test A | |
| --- | --- |
| Surfactant | Rating |
| prepared according to Example 3 | 3.5 |
| prepared according to Example 4 | 3.5 |
| prepared according to Comparative Example C1 | 4.5 |
| prepared according to Comparative Example C2 | 4.5 |
| DOWFAX ™ 20B102[1] | 4.5 |

[1]nonionic surfactant available from The Dow Chemical Company.

TABLE 4

| Spotting Test B | |
| --- | --- |
| Surfactant | Rating |
| prepared according to Comparative Example C3 | 3.9 |
| DOWFAX ™ 20B102[1] | 4.8 |

[1]nonionic surfactant available from The Dow Chemical Company.

Example 6: Preparation and Testing of Surfactant Mixture

Surfactant is prepared via one-pot ethoxylation and capping of dodecanol/tetradecanol. A 2-L Parr reactor was charged with 79.03 g of a mixture containing 68-78% dodecanol and 20 to 30% tetradecanol (available from Procter & Gamble as CO-1270) and 2.85 g of powdered 85% potassium hydroxide, and after a pressure check and a series of nitrogen purges, the mixture warmed to 125° C. A slow nitrogen purge through the dip pipe and out the reactor vent removed 8.5 g of condensate. The pressure was released and the vent valve closed for the addition of 394.0 g of ethylene oxide (approximately 22 eq.) at an addition rate of 1 to 3 g/min. The total addition time was 3 hours. The pressure stabilized about 10 minutes after the addition was complete. The mixture was held at temperature for an additional 50 minutes, then cooled to 100° C. and held overnight. The reactor was vented and the reaction product was cooled to 50° C. while purging slowly with nitrogen through the dip tube. The system was opened and a 2.6 g sample of the product was removed for analysis. To the remaining material held at 50° C. in the Parr reactor were charged 106 g of 2-ethylhexyl glycidyl ether (approximately 1.4 molar equivalents), and after sealing, a pressure check, and a series of nitrogen purges, the mixture was warmed to 140° C. at a rate of 1° C./min and held at temperature for 6 hours, then cooled to 60° C. at a rate of 1° C./min After opening and sampling for analysis to confirm reaction completion, the reaction product was unloaded to afford 548.3 g. GPC results: $M_W$=1300, $M_N$=1230.

Testing in Automatic Dishwashing

Rinse performance tests were performed using the conditions described above. After 5 cycles, the glasses for a condition including 1 g (5% of detergent) of surfactant of this Example 6 were compared in their spotting and filming ratings. The spotting and filming ratings for Example 6 were 1.5 and 2.1, respectively, compared with 2.9 and 1.9, respectively, for a 1,2-epoxydecane-capped ethoxylated alcohol surfactant DEHYPON E-127, a product of BASF Corp.

We claim:

1. A surfactant for use in an automatic dishwashing composition, wherein the surfactant is a glycidyl ether-capped ethoxylated alcohol of formula I:

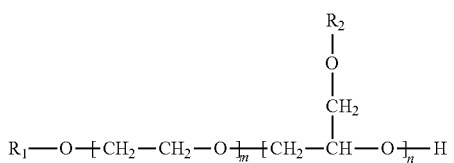

(I)

wherein $R_1$ is a linear, saturated $C_{8-24}$ alkyl group, $R_2$ is a linear or branched saturated $C_{6-20}$ alkyl group, m has an average value of 10 to 50, and n has an average value of >1 to 2.

2. The surfactant of claim 1, wherein n has an average value of 1.1 to 2.

3. The surfactant of claim 1, wherein n has an average value of 1.2 to 1.6.

4. An automatic dishwashing composition comprising:
a dispersant polymer comprising monomer units of at least one of acrylic acid, methacrylic acid, itaconic acid and maleic acid;
a builder; and
a surfactant, wherein the surfactant is a glycidyl ether-capped ethoxylated alcohol of formula I:

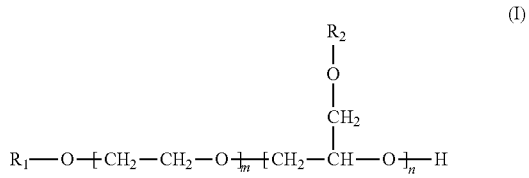

(I)

wherein $R_1$ is a linear, saturated $C_{8-24}$ alkyl group, $R_2$ is a linear or branched saturated $C_{6-20}$ alkyl group, m has an average value of 10 to 50, and n has an average value of >1 to 2.

5. The automatic dishwashing composition of claim 4, wherein $R_1$ is a linear, saturated $C_{10-14}$ alkyl group.

6. The automatic dishwashing composition of claim 4, wherein $R_2$ is a branched saturated $C_{6-10}$ alkyl group.

7. The automatic dishwashing composition of claim 4, wherein the dispersant polymer comprises a homopolymer of (meth)acrylic acid, a copolymer of methacrylic acid and at least one other ethylenically unsaturated monomer, salts thereof, and mixtures thereof.

8. The automatic dishwashing composition of claim 4, further comprising an optional component selected from the group consisting of a bleaching agent, a bleach activator, a bleach catalyst, an enzyme, and an aminocarboxylate chelant.

9. The automatic dishwashing composition of claim 4, wherein the automatic dishwashing composition contains less than 0.1 wt % phosphate (measured as elemental phosphorus).

10. A method of cleaning an article in an automatic dishwashing machine, the method comprising:
applying to the article the automatic dishwashing composition of claim 4.

* * * * *